United States Patent
May

Patent Number: 5,574,503
Date of Patent: Nov. 12, 1996

[54] ADAPTIVE INTERFRAME VIDEO DATA COMPRESSION AND START-UP TECHNIQUES

[75] Inventor: Anthony F. May, Cedar Rapids, Iowa

[73] Assignee: Rockwell International, Seal Beach, Calif.

[21] Appl. No.: 860,944

[22] Filed: Mar. 31, 1992

[51] Int. Cl.$^6$ ............................................... H04N 7/24
[52] U.S. Cl. ............................ 348/409; 348/27; 348/420
[58] Field of Search ................................ 358/133, 135, 358/136; 348/27, 384, 390, 400, 401, 403–405, 409, 420; 382/232, 236, 238, 251; H04N 7/130

[56] References Cited

U.S. PATENT DOCUMENTS

| | | | |
|---|---|---|---|
| 3,553,361 | 1/1971 | Mounts | 358/136 |
| 4,302,775 | 11/1981 | Widergren et al. | 358/136 |
| 4,855,825 | 8/1989 | Santamaki et al. | 358/135 |
| 4,979,038 | 12/1990 | Guichard et al. | 358/135 |
| 5,164,819 | 11/1992 | Music | 358/136 |

*Primary Examiner*—Tommy P. Chin
*Assistant Examiner*—Richard Lee
*Attorney, Agent, or Firm*—Kyle Eppele; M. Lee Murrah; G. A. Montanye

[57] ABSTRACT

A start-up and compression technique for transmitting data. A process is provided which utilizes the calculated difference between individual pixel values of subsequent video frames to the current displayed data in order to update. Additionally, techniques are provided for restarting on-going transmissions and for system initialization based on a variations or suspension of the described interframe compression technique.

16 Claims, 12 Drawing Sheets

ADAPTIVE INTERFRAME VIDEO DATA COMPRESSION AND START-UP TECHNIQUES

BACKGROUND OF THE INVENTION

This invention relates to processing of transmitted electronic information and more specifically to real-time compressed video data techniques.

Numerous applications exist today requiring large amounts of digitized video data to be transmitted for reception and interpretation at a remote location. Many of these applications, such as remote controlled vehicles, video teleconferencing, guidance control systems, surveillance systems or other video sensing applications, require real-time or near real-time processing of transmitted information. In order to satisfy throughput requirements of the transmitted information, data compression techniques provide for approximating certain transmitted data based upon selection criteria sometimes tailored to specific applications. These compression techniques tend to sacrifice a certain amount of preciseness for lower data rate or computational simplicity.

In any given data transmission an instantaneous representation or "snapshot" of the information to be transmitted is captured and processed in a manner consistent with the intended receiver technology. These individual snapshot representations are routinely updated, processed and transmitted to provide a reasonable approximation of the actual scene to the displayed image.

In video transmissions the snapshot is represented by an individual frame which is comprised of strategically ordered picture elements (pixels). The frames are transmitted at a specific rate, such as 30 frames per second, thereby providing the updated status of the processed information. The individual video frame is typically composed of a uniform number of picture elements such as 245,760 pixels for a 512×480 array.

Since individual pixels consist of several bits of binary information representing a defined color or shade, it is possible and well known to process the pixels in defined p×p data blocks. Depending upon the timing and resolution requirements, a variety of techniques may be employed to perform data compression within any given frame. While such data compression is useful, most current video data transmission systems provide more information (frames) than can be economically received and processed in real-time in terms of hardware for a required data bandwidth for data. Current solutions mainly focus upon data compression using high cost, high resolution approaches.

Current fielded video compressors adjust compression thresholds by determining after-the-fact how much compressed data was produced for a given threshold setting and using the fullness or emptyness of a first-in-first-out memory to either increase or decrease the threshold setting. This methodology of threshold "guessing" used in the prior art is eliminated by the teachings of this application.

There exists a need for improved economical compression techniques that minimize guessing, high cost and latency deficiencies.

SUMMARY OF THE INVENTION

The present invention comprises start-up and compression techniques for transmitting video data. A process is provided which utilizes the calculated difference between individual pixel values of subsequent video frames to the current displayed data in order to make update decisions. Additionally, techniques are provided for starting or restarting a data transmission.

The interframe video data compression technique is based upon a series of calculations, derivations and comparisons which provide maximum dynamic video transmissions for a fixed or minimal data bandwidth system. The video compression technique is described with respect to a video surveillance system, FIG. 1, comprised in part of a video coder and a video decoder and assumes a 512×480 pixel array display for example purposes. It is understood that the same technique is readily portable to various hardware specific environments or applications.

In the video coder, data comprising a frame of 512×480 information is typically manipulated in rectangular positional blocks p×p in size such as 4×4 or 8×8 pixel blocks. The displayed data at any instantaneous point in time can be described and tracked with regards to newly acquired data by comparing values of individual elements. Thus, assuming an on-going transmission, the first step of the disclosed compression technique comprises calculating the absolute difference between corresponding data of the current video data and the new video data.

A threshold value is determined that eliminates calculated differences of low value which might be attributable to analog-to-digital quantization errors. A histogram of the calculated differences is then constructed. Next a discrete distribution function is created based upon the information contained in the histogram and system constraints.

The desired data transmission rate, update rate and additional compression techniques (if any) of the system are analyzed to determine the amount of information contained in a single frame expressed in bits. The total number of bits per frame is contrasted to the data transmission rate so that a ratio of acquired data to transmitted data is obtained, known as the compression ratio. Additional consideration may be given to administrative or side data necessary to decode the compressed frame.

A second data threshold, hereafter referred to as "Adaptive Threshold", is then determined based upon the earlier derived data compression ratio. The Adaptive Threshold value will change from frame to frame depending upon the motion and establishes the numerical value of the absolute difference between pixel blocks in the current frame and in the update (or new frame) above which compression and transmission occurs.

A binary map of the update frame is constructed which indicates whether or not a particular pixel block has been compressed and transmitted for update. Pixel blocks having differences that place them above the Adaptive Threshold value are compressed and transmitted along with the appropriate binary map.

In the video decoder, upon reception and decoding of the compressed video data, the display is updated with as much information as the transmission channel will allow. The display video data is limited to those data blocks within a frame having the largest detected changes as determined by the video coder.

The process is successively repeated during continued transmission of video data frames.

In addition to the above described interframe video data compression technique, a start-up process utilizing a variation of the above scheme is also disclosed. When the system is initialized, the current frame memory of all previously transmitted blocks would be empty. Thus, any selected data blocks transmitted for subsequent comparison would be acceptable. A next new frame is then acquired and is differenced with the previous frame memory of all previously transmitted blocks. Instead of using the Adaptive Threshold for determining blocks with frame differences above a certain level, the percentage of blocks to be transmitted may be determined with the lowest motion content. In this manner all video data blocks would be transmitted at least once to establish an initial image at the decoder. This necessary operation will occur in a relatively short period of time.

The initialization routine can also be used when the discrete distribution function and Adaptive Threshold determination obtain an Adaptive Threshold value which is larger than some predetermined bound. In both of these cases the starting or restarting of the video compression technique can prevent the system from motion overload.

A system restart technique that cancels the compression techniques of the current invention while systematically providing a refreshed transmitted image for display is also contained herein.

It is an object of the present invention to provide an interframe high speed and high accuracy video data compression technique.

It is a further object of the present invention to provide a start-up technique utilizing the video compression technique disclosed herein.

It is yet a further object of the present invention that the disclosed video data compression technique can produce an Adaptive Threshold value which will provide the exact amount of video data to maintain a fixed rate data channel filled (but not over full) to capacity.

It is yet a further object of the present invention to provide a process for restarting or "refreshing" an on-going data transmission.

It is a feature of the present invention to accomplish video data compression establishing Adaptive Threshold values that provide for transmission of the most dynamic video data.

It is another feature of the present invention to utilize an Adaptive Threshold for initializing a data transmission based on the lowest detected motion.

It is yet another feature of the present invention to provide for predetermined data transmission restart to minimize the effects of corrupted data.

It is an advantage of the present invention that the transmission channel between the video coder and decoder during on-going operation always contains updated video data of the video pixel blocks that exhibit the most change from the currently displayed video data.

It is another advantage of the present invention that system initialization occur using a combination of dynamic data and minimal time.

It is yet another advantage of the present invention that on-going data transmission restarting is accomplished with a predetermined "freezing" effect on the transmission.

These and other objects, features and advantages are disclosed and claimed in the specification, figures and claims of the present application.

DETAILED DESCRIPTION OF THE FIGURES

Figure 1:
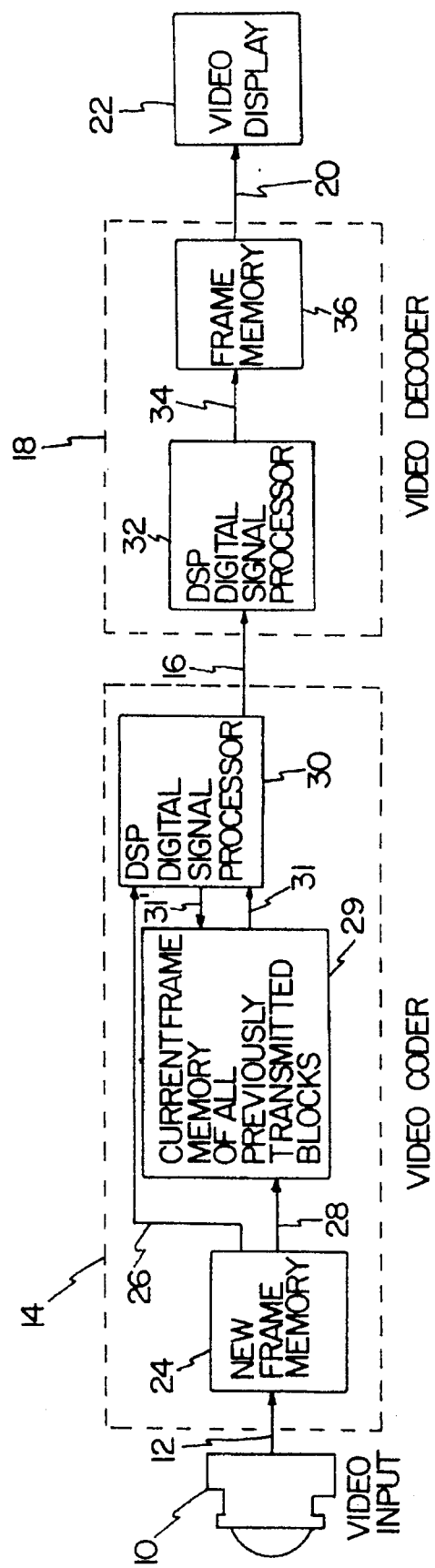
FIG. 1 is a block diagram of a representative video communication system using the data compression technique of the present invention.

Referring now to the Figures where like items are referenced as such throughout, FIG. 1 shows a block diagram of a video surveillance system that incorporates the teachings of the present invention. A camera 10 is linked via a first channel 12 to a video coder 14. Video coder 14 is coupled via a second channel 16 to a video decoder 18. Video decoder 18 is in turn coupled via a third channel 20 to a video display 22. It is understood that channel 16 may comprise any combination of compatible cables, data transmitter and receiver, or the like capable of handling the specific data flow of any given application. It is also understood that channels 12 and 20 can be standard video connections, such as RS 170, in digital format or any non-standard format. In addition channel 16 may utilize magnetic storage media as found in a personal computer or workstation computing environment. For illustration purposes only channel 16 is defined as comprising an open-air radio transmission link.

Video coder 14 is further described as comprised of a new frame memory 24 having an input from channel 12 for receiving successive video frames. The outputs 26 and 28 of memory 24 are coupled to a Digital Signal Processor (DSP) 30 and a current frame memory device 29 for storing previously transmitted frames (if any). The output 31 of the current frame memory is also coupled to DSP 30.

Video decoder 18 receives input via channel 16 which is routed to DSP 32. DSP 32 is coupled to a frame memory 36 which in turn has its output represented by channel 20.

Figure 2:
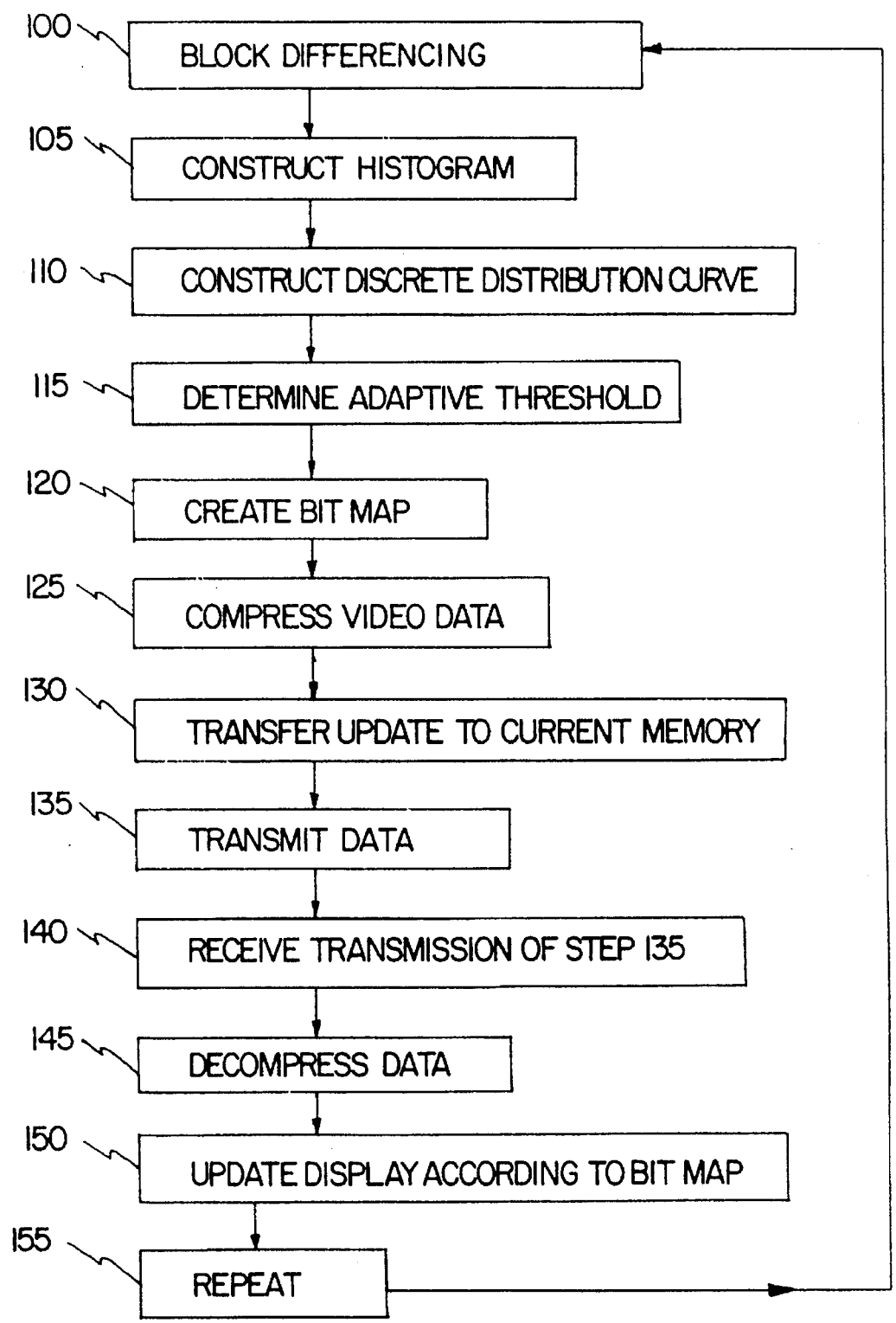
FIG. 2 is a flowchart representation of the Adaptive Threshold compression technique of the present invention.

FIG. 2 is a flow chart representation of the operational process steps of the current invention explained in terms of the communication system of FIG. 1. Block differencing, step 100, is the initial function of the present invention for a video coder system. Block differencing comprises a comparison of the current frame memory of all previously transmitted block picture elements to the new frame by calculating individual pixel block differences. The coder DSP 30 of FIG. 1 differences the video data stored in memories 29 and 24 respectively. All other video coder calculations are performed by DSP 30. Next a histogram is constructed, step 105, of the absolute difference values calculated in step 100. A discrete distribution function, step 110, is then calculated for the histogram of step 105. In step 115 the Adaptive Threshold value is determined. The Adaptive Threshold determines which pixel blocks in the update frame will be transmitted. A bit map of the entire update frame is created, step 120, designating which pixel blocks will receive new data. Step 125 represents actual compression of the designated blocks. Step 130 consists of transferring the update video data from the new frame memory 24, to the current frame memory 29, of all previously transmitted blocks memory. The bit map and data are transmitted in step 135. The transmission occurs over channel 16 in FIG. 1 and received by the decoder in step 140.

Upon reception of the transmitted data of step 135, decompression and reconstruction of the data occurs. In step 145 the compressed video data stream is decompressed. Step 150 updates the display as specified by the bit map. Steps 140 and 145 are carried out by DSP 32 in FIG. 1, while step 150 is carried out by frame memory 36. The process is successively repeated, step 155, during continued transmission of data frames. The interframe video compression method used in Steps 125 and 145 are block oriented video compression method. Step 130 could include storing a reconstructed version of video.

A detailed discussion of the above steps, utilizing the representative drawings in FIGS. 3 through 12 is now provided. An example data transmission of a 512×480 pixel array grouped into 64×60 matrix of 8×8 pixel blocks was utilized in compiling the test data. The new frame data and the current frame memory of all previously transmitted data blocks are comprised of new pixels (NP) and current pixels (CP), respectively. The double summation of absolute values of the differences in the corresponding pixel locations of the new frame and current frame are calculated. Mathematically, the equation is as follows:

$$DIFF(m,n) = \sum_i \sum_j |CPij - NPij| \quad \text{Equation \#1}$$

Where DIFF = the m row, n column block difference of pixel block values m=1,2,3, . . . 60 n=1,2,3, . . . 64

CPij = Current Pixel Value, i row and j column

NPij = New Pixel Value, i row and j column with respect to i=1,2,3,4,5,6,7,8 j=1,2,3,4,5,6,7,8

The 64×60 DIFF(m,n) values are then stored in a table in the DSP for subsequent additional processing. It is another teaching of this disclosure that since the video data is correlated, then using every fourth pixel will give equally good DIFF(m,n) values. For this method i=1,3,5,7 and j=1,3,5,7, which effectively quarters the number of computations in equation 1.

A determination may be made as to a threshold value $TH_x$ below which |CPij−NPij| will not be included in DIFF(m,n). When a value greater than zero is used for threshold $TH_x$, smaller calculated absolute values |CPij−NPij| are taken as zero and do not affect the equation 1 summation. When the value of $TH_x$ is set to a relatively small value, around 4, for the example, the errors due to quantization of the analog-to-digital conversion system two least significant bits are removed. (In a video system, if the same image is digitized twice, the stored numerical values will be different for both digitizations at a given pixel row and column location due to inaccuracies of the analog-to-digital converter and the imaging system.) If the threshold $TH_x$ is set higher than the value which nullifies the quantization error, between the values of 10 to 16 or more (for the given example), then equation 1 becomes an approximation to the mean square error, which is the summation of the squares of the differences instead of the absolute value of the differences. The mean square error effectively penalizes large deviations, which is the effect created by using higher values of the threshold $TH_x$ to eliminate smaller |CPij−NPij| calculations in equation 1.

Figure 3:
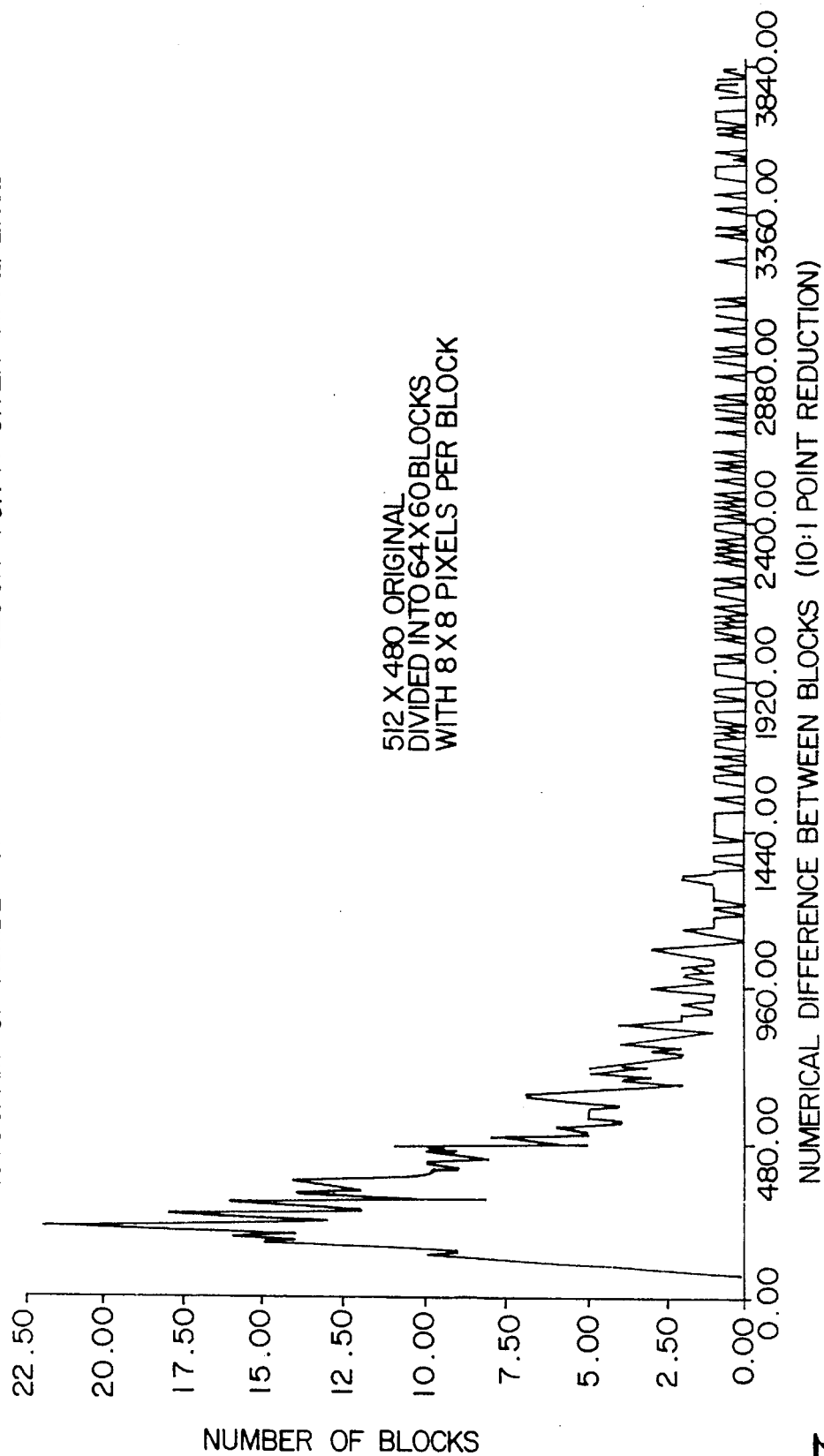
FIG. 3 is an example histogram of the number of different video data pixel blocks between two frames for a 512×480 original pixel array divided into 64×60 blocks of 8×8 pixels.

The histogram of step 105 is constructed from the calculated DIFF(m,n) values. FIG. 3 illustrates a typical histogram of the previous example having 3,840 DIFF(m,n) values. As an example from FIG. 3, a maximum of 22 pixel blocks have a DIFF(m,n) of around 215. The highest number of blocks with a given numerical difference between blocks is concentrated around the smaller differences (around 200) indicating that most new frame video data points exhibited relatively little change from the current frame. This shows that the video data from one frame to the next is highly correlated for blocks at a fixed row, column location.

Figure 4:
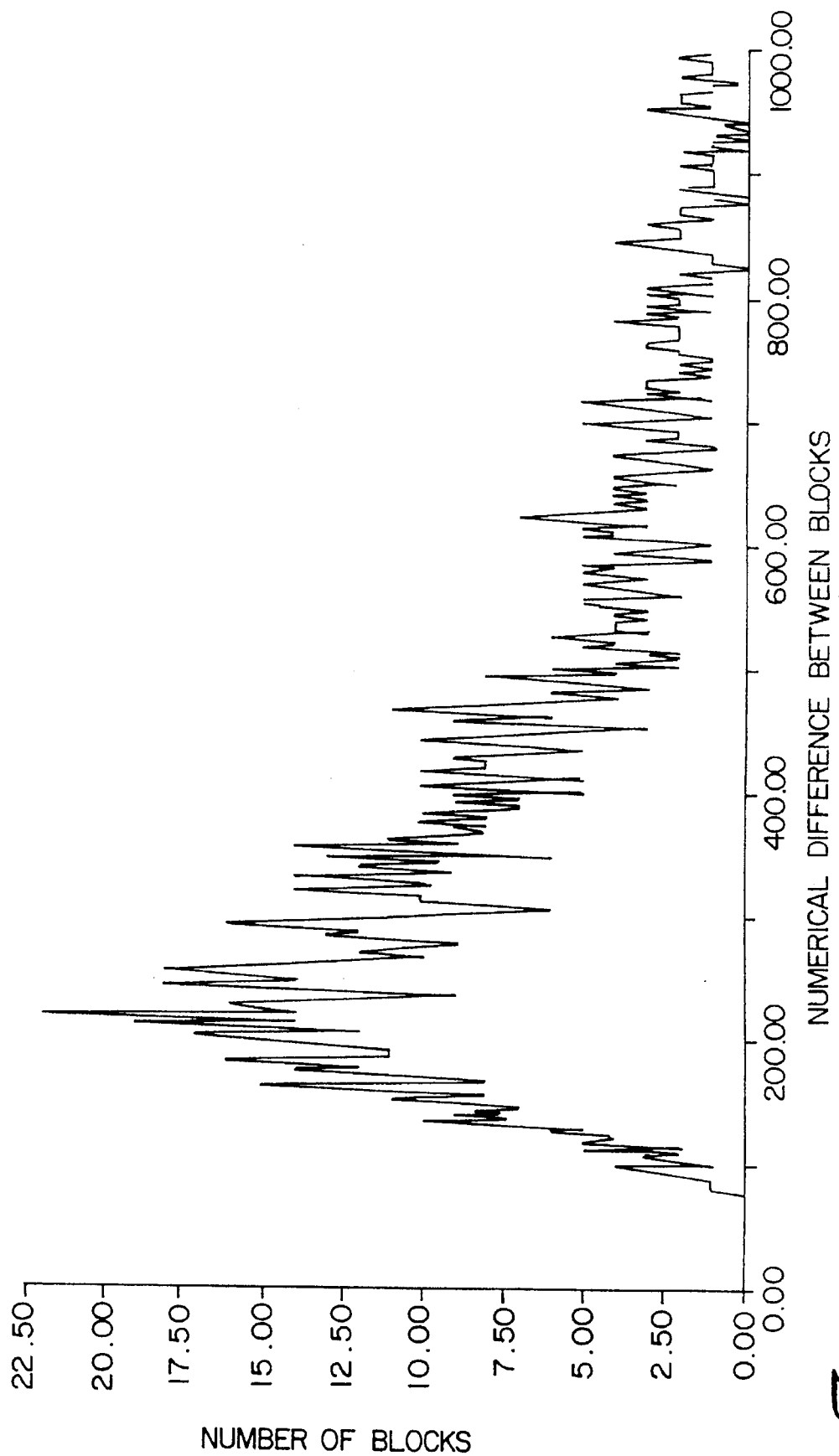
FIG. 4 is a portion of the histogram of FIG. 3 plotted over a different x-axis.
Figure 5:
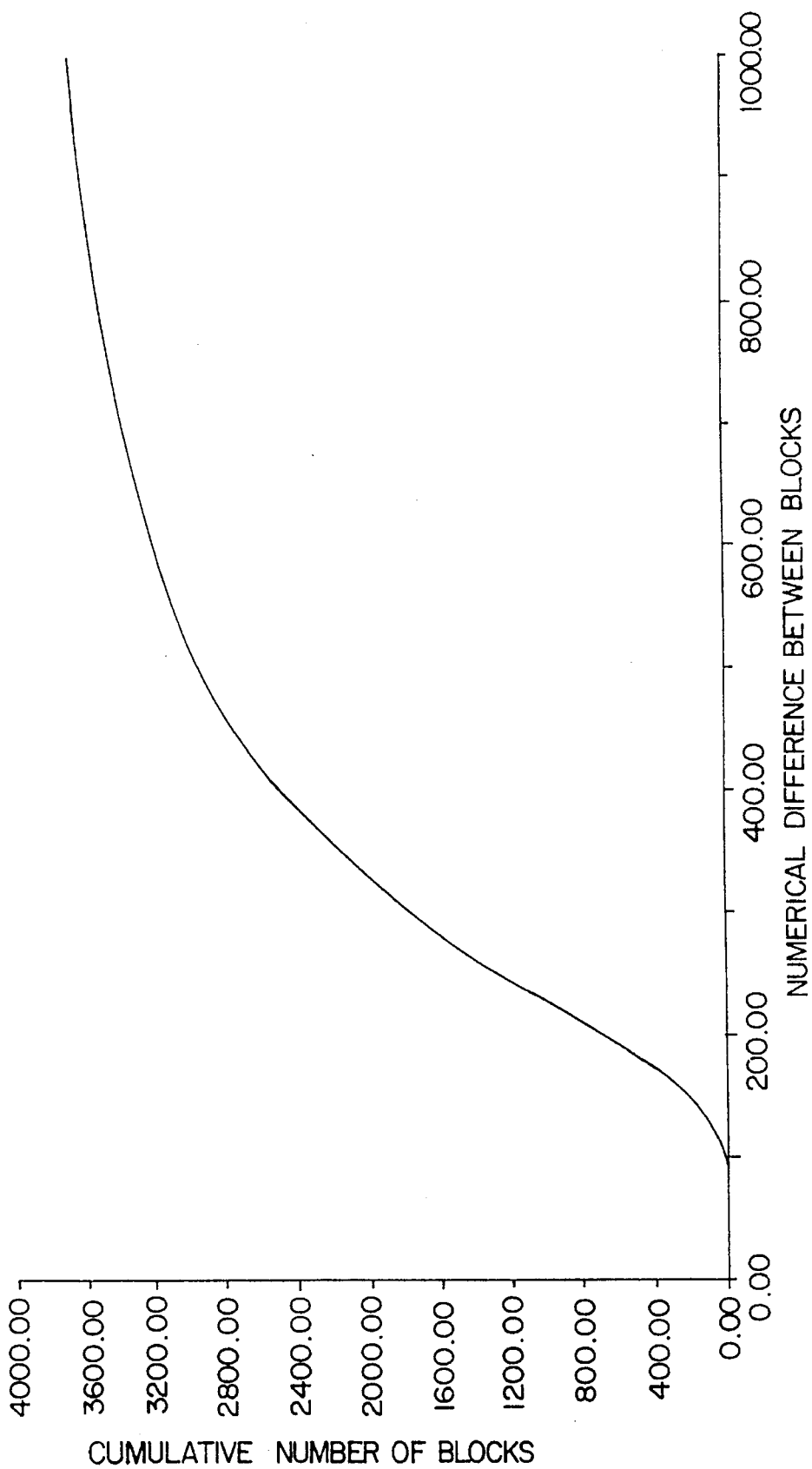
FIG. 5 is a probability distribution curve of the FIG. 4 histogram.
Figure 6:
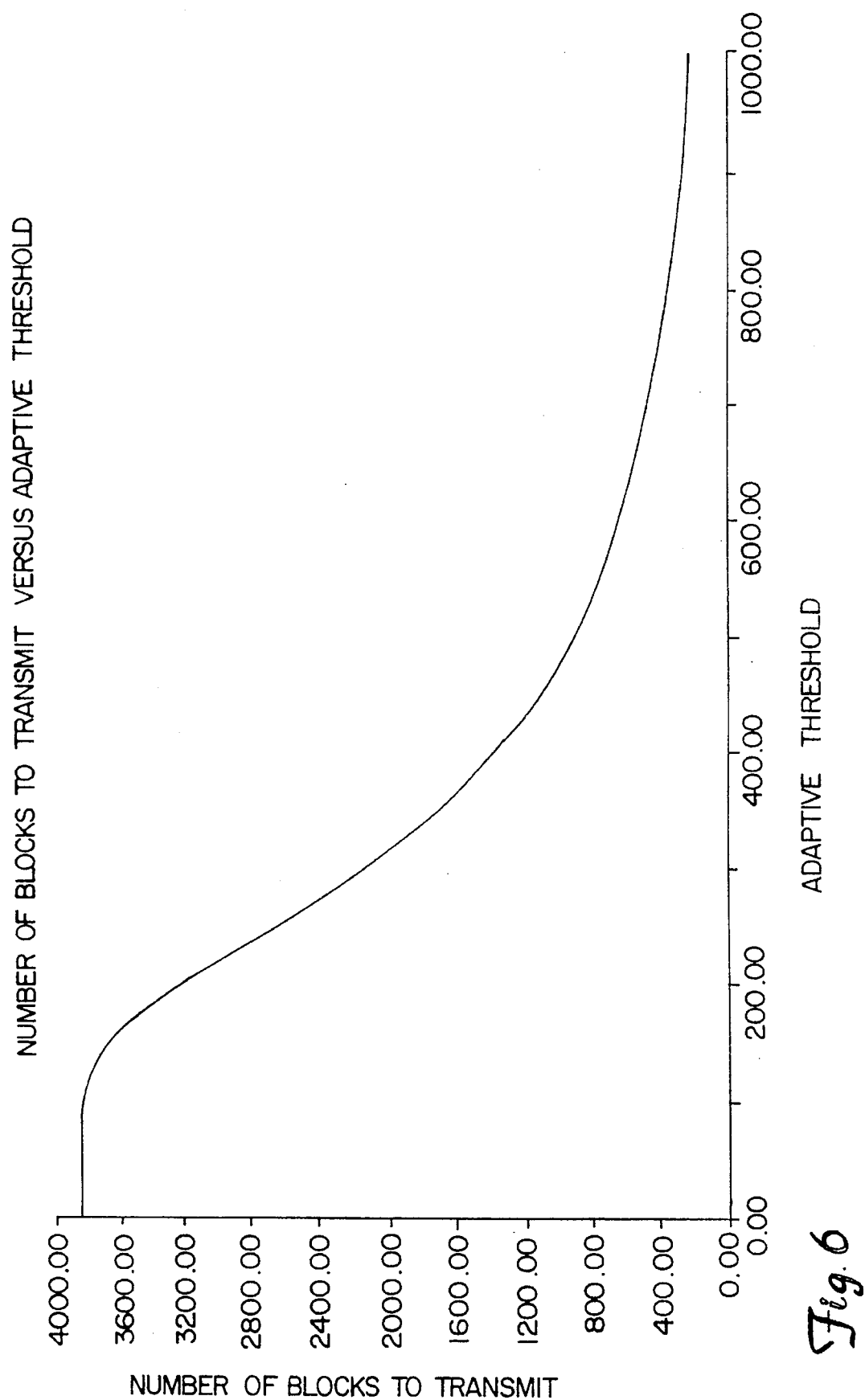
FIG. 6 is an inverted probability distribution curve of FIG. 4 (the total number of data blocks minus the probability curve).

A detailed representation of the curve of FIG. 3 is illustrated in FIG. 4. A discrete probability distribution function based on FIG. 4 is shown in FIG. 5 which is an accumulation of discrete histogram bin locations going from left to right in both figures. The discrete distribution has a maximum value of 3,840 since there are a total of 3,840 blocks in the example video frame. A more useful form of the discrete probability distribution of FIG. 5 is shown in FIG. 6. The curve of FIG. 6 represents the total number of DIFF(m,n), 3,840 for the example frame, minus the values in FIG. 5 at each point. The FIG. 6 discrete probability distribution function starts at 3,840 and decreases to zero.

In any given communication system, the desired data rate, video frame update rate, and the intraframe compression ratio determine the number of compressed video data blocks that can be transmitted for successive video frames. Assuming a fixed frame rate of 6 Hz and an intraframe video compression technique which renders a compression ratio of 0.4375 bits per pixel, 20% of the total number of pixel blocks per frame can be transmitted for a fixed data rate of 150 kbps. The total frame would require a data rate determined as follows:

| Total Frame Rate | = | (# of pixels per frame) | Equation #2 |
|---|---|---|---|
| | | (# frames per sec) | |
| | | (#bits per pixel) | |
| | = | (512 × 480 pix/fr) (6 fr/sec) (0.4375 bits/pix) | |
| | = | 645,120 bits/sec | |

Since the fixed data rate of the system for this example is 150 kbps, the percentage of blocks that can be transmitted in any one frame update may be determined by dividing the system data rate by the number of bits per frame.

% blocks to transmit = Fixed Data Rate/Total Frame Rate    Equation #3
= 150,000 bits per sec/645,120 bits per sec
= 23.23%

Figure 7:
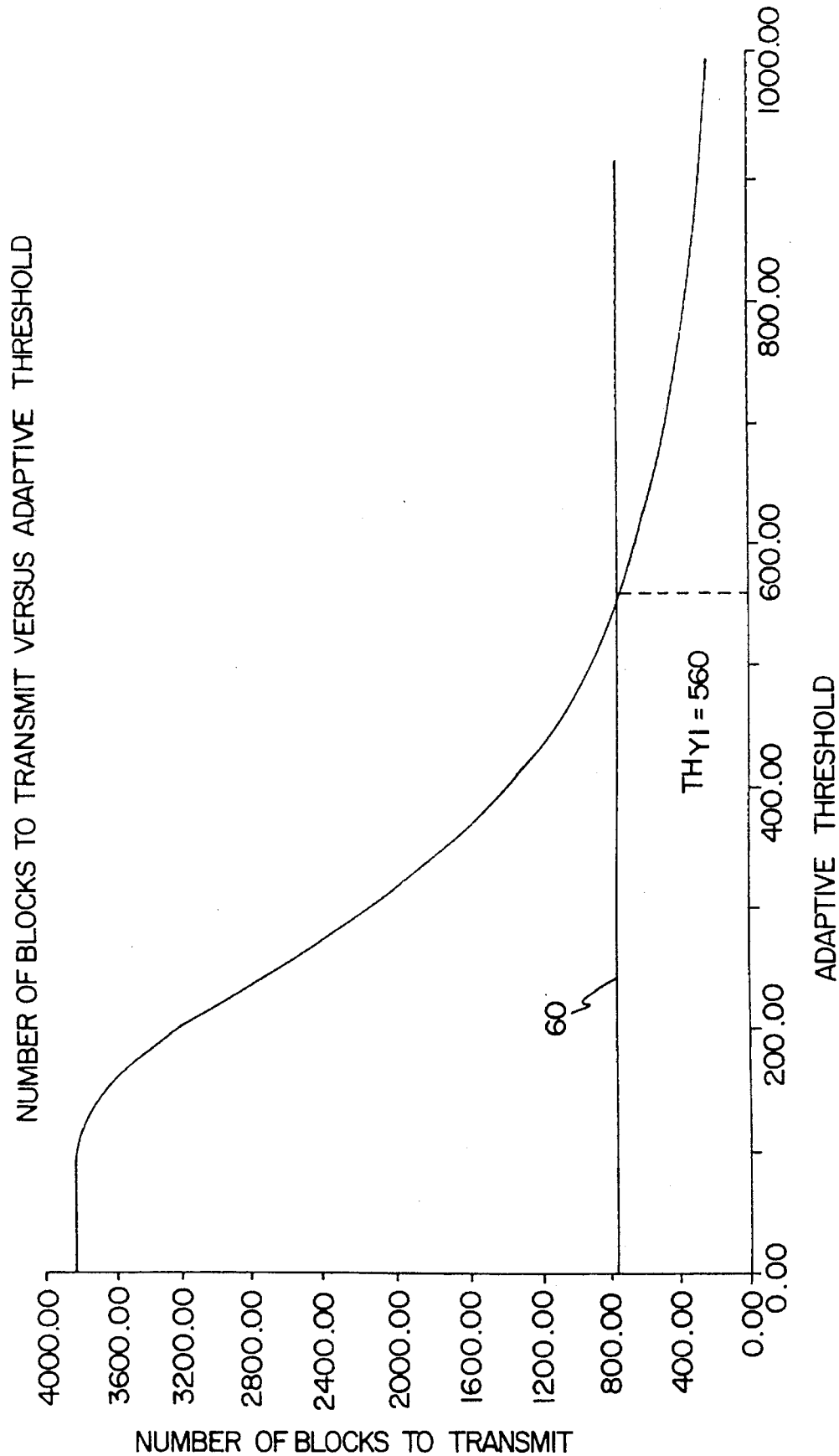
FIG. 7 shows the curve of FIG. 6 and the maximum data channel transmit capacity during one frame period (represented by the horizontal line) with a plotted Adaptive Threshold, $TH_{y1}$.

An amount less than 23% is chosen since there are overhead bits associated with this interframe compression technique such as positional information and error checking data. Thus, by utilizing 20% for the given example 768 data blocks (0.2×3840) are transmitted for each new frame. By inserting the 768 block limitation shown as a horizontal line 60 to the curve of FIG. 6, an Adaptive Threshold value $TH_{y1}$ is obtained, as shown in FIG. 7. $TH_{y1}$ represents the threshold of the numerical differences (the least amount of change) above which the new frame video will be transmitted for updating the displayed video data at the video decoder. FIG. 7 therefore represents the probability of the number of blocks to be transmitted given a fixed data rate limitation and the corresponding Adaptive Threshold $TH_{y1}$.

For FIG. 7, the number of Blocks to Transmit is 768. Adaptive Threshold value $TH_{y1}$ is found on the x-axis of FIG. 7 as approximately 560. Of course, when calculated on a computational device, an exact threshold will be found which may render a slightly different number than 560. The method insures that the Adaptive Threshold selected always keeps the channel exactly full with the most important video data; new video data that is most different from the corresponding video data in the current frame memory of all previously transmitted blocks. The video data which is most different is that with the most motion.

The value of $TH_y$ is compared with the 3,840 (64×60) DIFF(m,n) values stored for processing. Any differenced block values DIFF(m,n) which have a numerical value which exceeds $TH_y$ will result in the corresponding 8×8 pixel blocks being compressed and transmitted.

Administrative type information or side information is required to be transmitted over the channel in order to accurately updated the appropriate pixel blocks. A binary bit map of the m×n data bits is created and transmitted to the decoder to indicate which blocks are being transmitted for update. The bit map records a binary 1 for blocks being transmitted and a binary 0 for blocks not transmitted. The bit map positions correspond to the video current frame memory of all previously transmitted blocks' positions which are being updated. These bits have forward error correction and detection to insure that the bit map is properly received by the video compression decoder in the event of channel errors. The DSP 30 of the video coder shown in FIG. 1 passes the digital data, in serial form, along to the video decoder DSP 32 via channel 16.

If few enough blocks are transmitted during each update, it is more economical (in terms of transmitted bits) to use row and column coordinates to identify each compressed video block. Coordinates work best with fixed length compression schemes. For the 64×60 example, row and column would use 6 bits each. The break even point is 320 blocks for this example ((64×60)/12) where if less than 320 updated blocks are transmitted per frame it is more economical to use row and column coordinates. The row/column method is inherently more robust and requires less forward error correction.

In one embodiment, transmission of the compressed video information follows the transmission of the bit map. Any of the well known intraframe video compression techniques can be used to compress the selected video pixel blocks such as block truncation coding, transform coding (including the newest Joint Photographic Expert Group standard), and vector quantization.

As a last step, the new frame 8×8 pixel blocks which exceeded the Adaptive Threshold must be transferred from the new frame memory 24 into the current frame memory 29 of all previously transmitted blocks. The transfer updates the current frame memory 29 and allows the video compression coder to keep track of what has been previously transmitted to the video compression decoder. Thus, a record, the current frame memory, is kept in the coder 14 via memory 29 of what the decoder 18 contains in 36. The block differencing from step 1 compares the next new frame 24 to the updated current frame memory 29 of all previously transmitted blocks.

The video compression decoder receives the bit map and determines where on the displayed image, which is also divided into 8×8 pixel blocks, the received compressed video data will be displayed. The decoder uses the inverse of the intraframe compression scheme to reconstruct the video from the compressed video data. After one frame's compressed video blocks are received, decompressed, and displayed another bit map is received as well as the compressed video data from the following frame. The video decoder of the FIG. 1 uses the DSP 32 as well as other digital hardware contained in the frame memory 36 to perform all operations. The DSP 32 places the reconstructed image data in the frame memory 36. The video output is then displayed on the video display 22. The previous steps are successively repeated for each new video frame.

Figure 8:
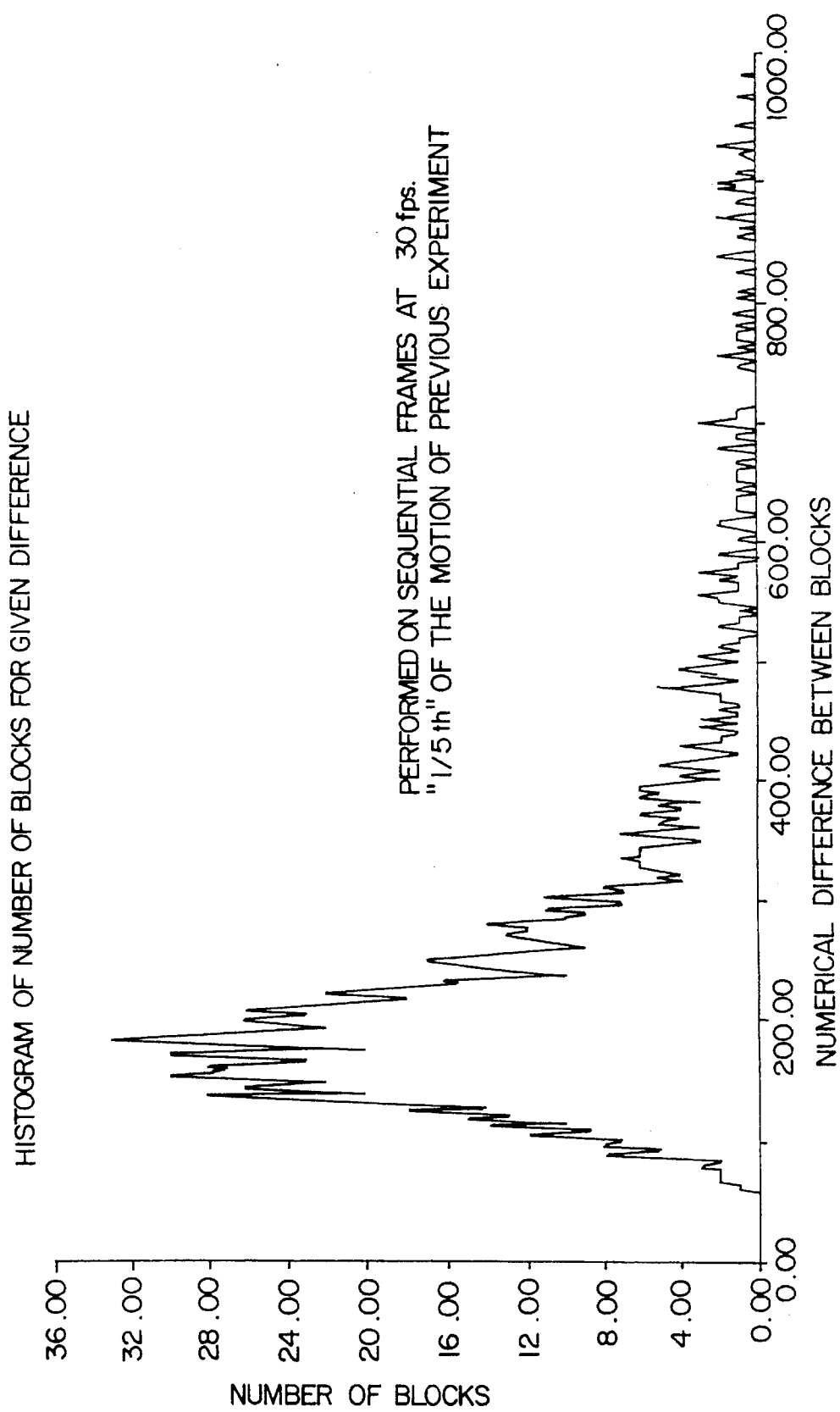
FIG. 8 shows a histogram for a low motion 512×480 frame array corresponding to FIG. 4.
Figure 9:
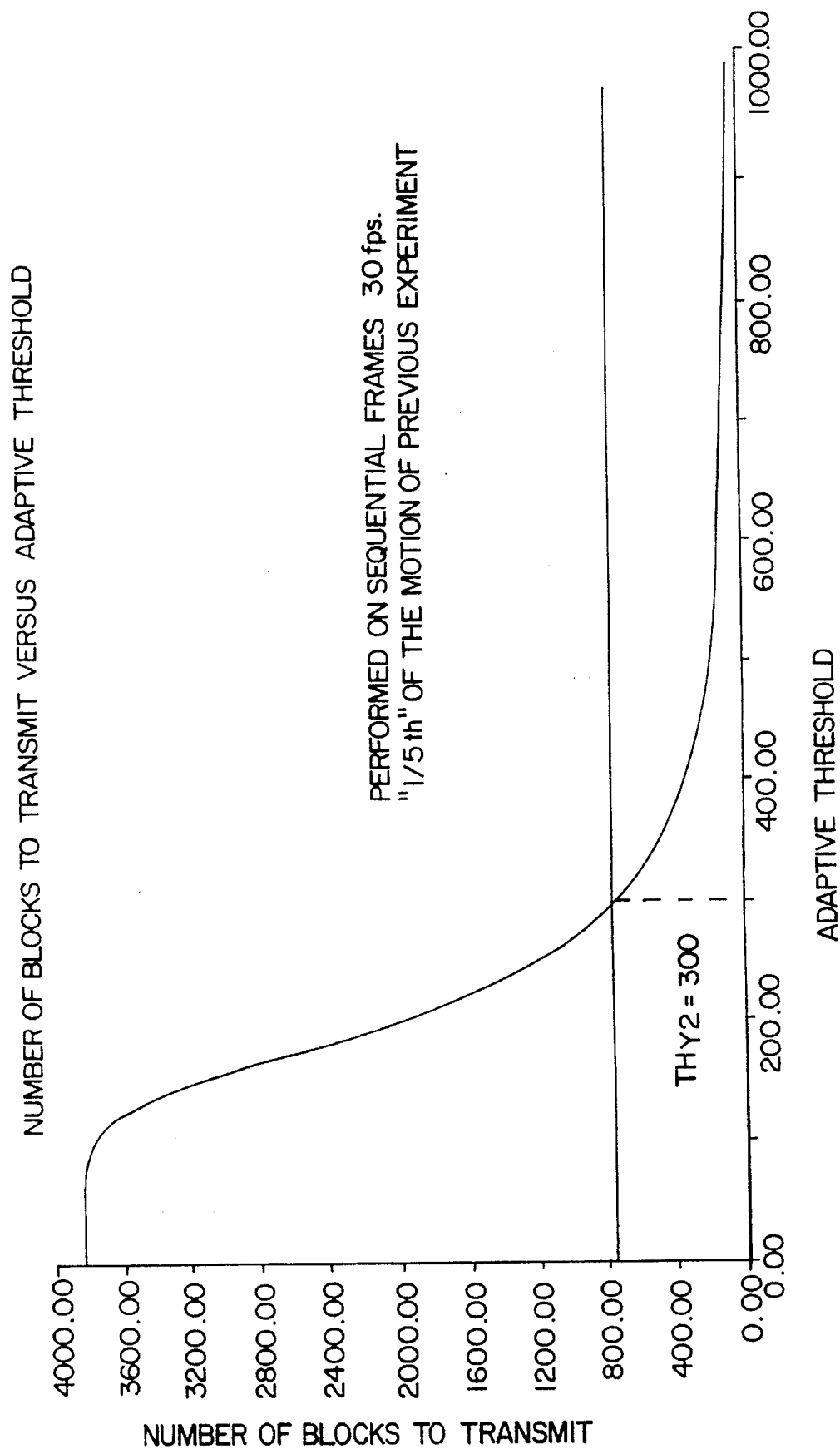
FIG. 9 shows the curve of FIG. 6 and the maximum data channel transmit capacity during one frame period (represented by the horizontal line) with a plotted Adaptive Threshold, $TH_{y2}$.
Figure 10:
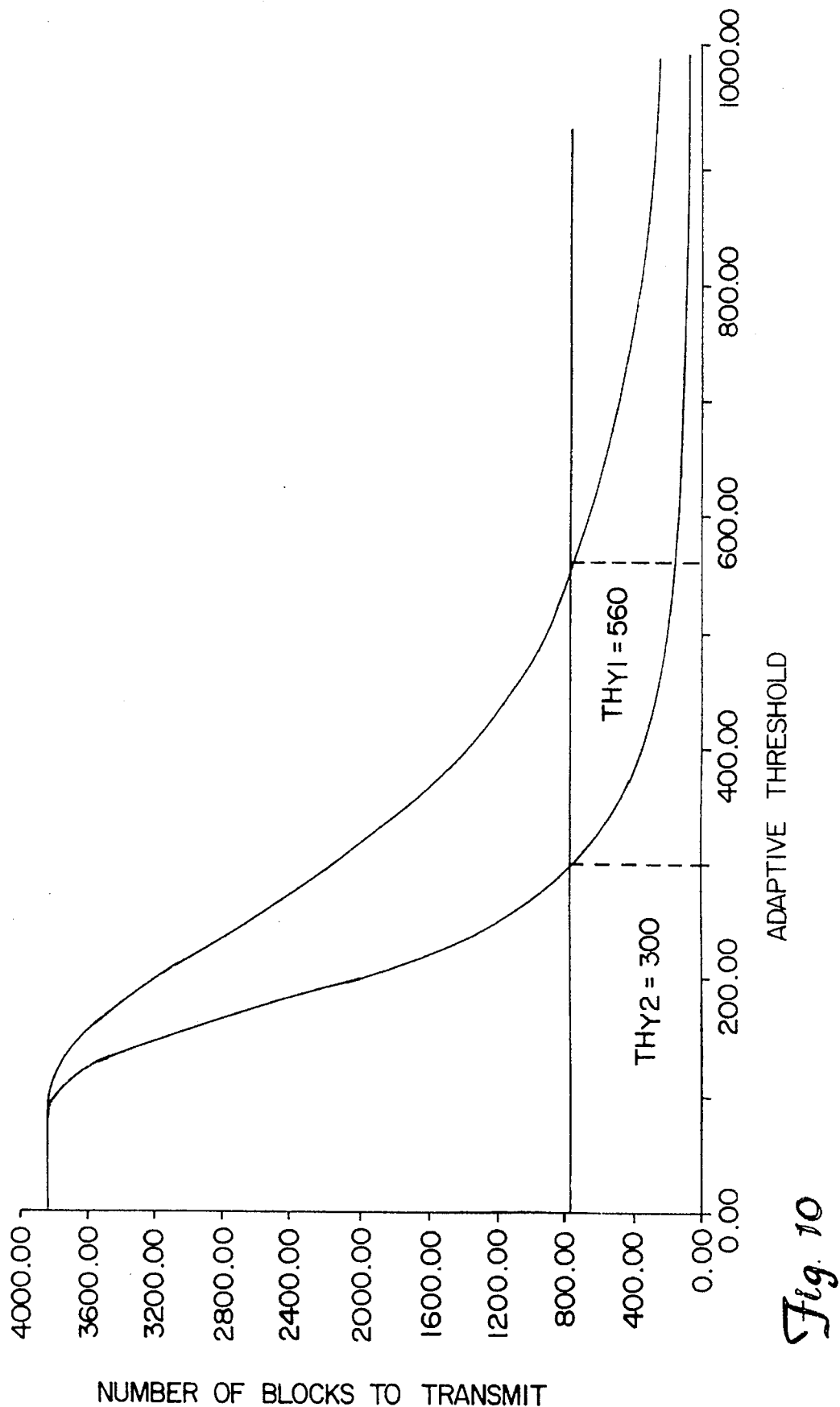
FIG. 10 shows the Adaptive Threshold values of FIGS. 7 and 9 superimposed showing high $TH_{y1}$ and low $TH_{y2}$ motion.

The above described interframe video compression technique has a display resolution which depends on the motion content between two successive frames but has a minimum resolution based on the intraframe video compression used in low motion scenes. FIGS. 3 through 7 illustrate frame differences with relatively high motion content. FIGS. 8 and 9 are the histogram and discrete distribution function for corresponding frame differences with relatively low motion content corresponding to FIGS. 3 and 7. The Adaptive Threshold obtained from FIG. 9 for 768 blocks to transmit, $TH_{y2}$, found on the x-axis, is somewhere around 300. For a direct comparison, FIG. 10 shows both high motion and low motion discrete distribution functions superimposed. Recall that Adaptive Threshold selected for the high motion case, $TH_{y1}$ was approximately 560 from FIG. 7. FIG. 9 thus shows that different Adaptive Thresholds $TH_y$ are selected for 20% blocks transmission for high motion ($TH_{y1}$=560) and low motion ($TH_{y2}$=300). In general, each new frame will have a unique histogram formed from the DIFF(m,n) values, a unique probability discrete distribution function and a unique Adaptive Threshold value $TH_y$ from the (inverted) probability discrete distribution function.

When the higher value Adaptive Threshold $TH_{y1}$ of 560 is adaptively determined, only new p×p pixel blocks with large differences of 560 or greater between the new frame memory and the current frame memory of all previously transmitted blocks, as calculated by equation 1, will be selected for transmission. This decision is set forth in the following inequality: DIFF(m,n)>560 for all m,n. All blocks with Adaptive Threshold $TH_y$ 560 or less will not be transmitted. This does not mean that the p×p pixel blocks with smaller differences are not important video information, and indeed a perfect reconstruction for the image would require all blocks to be transmitted.

In addition to the above described interframe data compression technique, a start-up process utilizing the above scheme is also disclosed. When the system is initialized the current frame memory of all previously transmitted blocks would be empty. Thus, any selected data blocks transmitted for subsequent comparison would be acceptable. A next new frame is then acquired and is differenced with the previous frame memory of all previously transmitted blocks. Instead of using the Adaptive Threshold for determining blocks with frame differences above a certain level, the percentage of blocks to be transmitted may be determined with the lowest motion content as determined by the Adaptive Threshold and the difference values. In this manner transmission of all data at least once should occur in a relatively short period of time.

Figure 11:
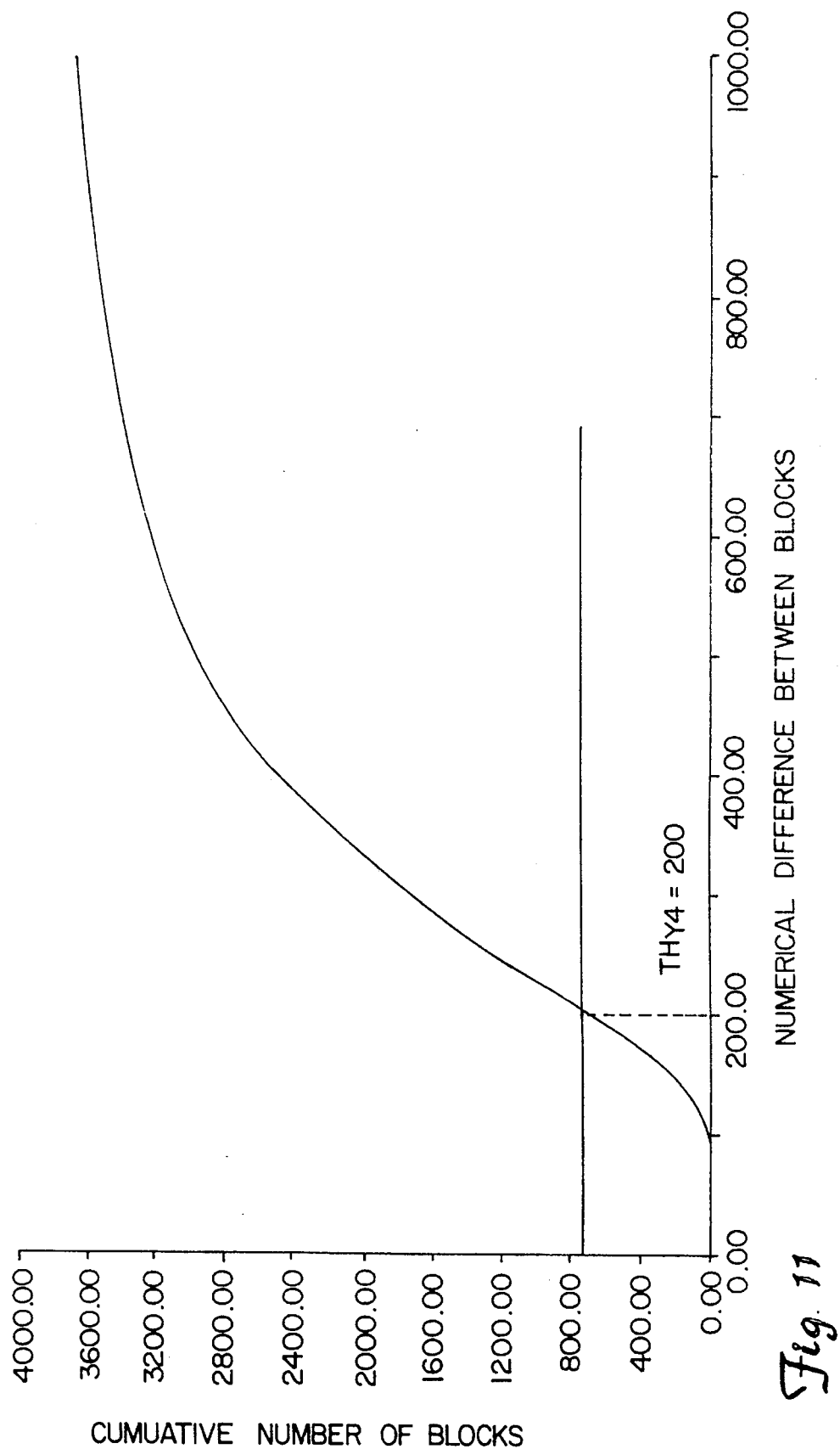
FIG. 11 shows the curve of FIG. 5 with the maximum data channel transmit capacity during one frame period (represented by the horizontal line) with a plotted Adaptive Threshold $TH_{y4}$.
Figure 12:
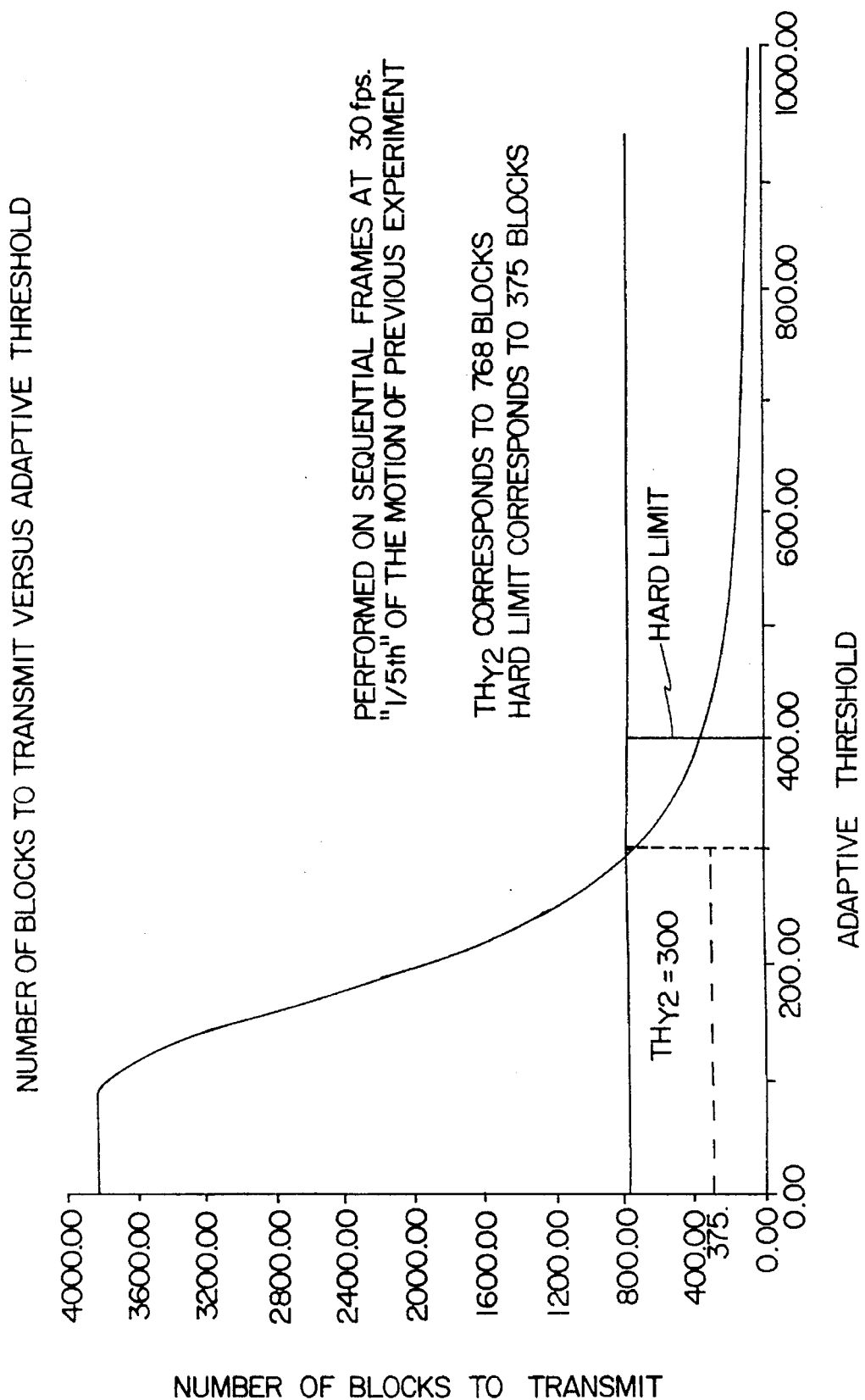
FIG. 12 shows the curve of FIG. 9 with a hard limit applied to the Adaptive Threshold.

Instead of using the inverted discrete distribution functions of FIGS. 7 and 9 to determine the Adaptive Threshold $TH_Y$, FIG. 11 with a line drawn at 768 blocks (20%) pictorially represents the determination of $TH_Y$ for initialization. (There is no Figure for the low motion case which corresponds to FIG. 11.) FIG. 11 using the unsubtracted distribution curve renders an Adaptive Threshold value of approximately 200 shown as $TH_{Y4}$. Blocks with absolute differences less than 200 would be compressed and transmitted (DIFF(m,n)<200).

During system initialization a temporary record is made to indicate which of the total number of pixel blocks to be transmitted (3,840 pixel blocks for the previous example) have been transmitted at least once. After all pixel blocks are transmitted once, normal operation resumes. In an ideal situation, the starting of the video coder would take a minimum of 5 frames, since 20% of the blocks are transmitted per frame. For frames at the example 6 Hz rate, five frames would take 0.83 seconds (5 frames/6 Hz).

It may take the compression scheme more than one attempt to achieve initialization. For instance, under high motion conditions, when transitioning from initialization to normal operation, a very high initial Threshold $TH_Y$ may be used to trigger an immediate restart. This methodology uses the fact that good still images are better than images which are too blurry from high motion.

The initialization routine can also be used at any other time when the discrete distribution function and Adaptive Threshold determination of steps 110 and 115 of FIG. 2 obtain an Adaptive Threshold value which is larger than some predetermined bound or "upper limit". In both of these cases the starting or restarting of the video compression technique can prevent the system from motion overload. Motion overload is herein defined as the total scene difference between two successive frames of video data that have so much motion content that the video compressor is prohibited from transmitting video blocks whose DIFF(m,n) values are quite large but less than the Adaptive Threshold value. In such an instance a restart would render better results for the high motion data input than an attempt to transmit motion which is literally getting away from the video coder. In this case as well as the initialization which does not smoothly transfer to normal operation—good still images are better than images which are too blurry from high motion.

Since the coder of FIG. 1 has no method of determining what was actually received by the decoder, a practical compression system may periodically execute the restart method described above. Even when forward error correction and detection are used to combat channel errors in channel 16 of FIG. 1, the error correction capabilities can become exceeded in certain applications. Periodic restarting will insure a certain minimum integrity of the received image. For instance, if restart is accomplished every six seconds, the longest period that a viewer of the video display of FIG. 1 will see a corrupted reconstructed image is six seconds.

Either initialization or restarting tends to freeze the motion which is an undesirable feature for interframe video compression. In some applications, this freezing of motion may be advantageous, however, a method to minimize the restarting effect is to perform restarting as infrequently as possible.

An alternate restart approach not utilizing the Adaptive Threshold of the present invention comprises transmitting successive portions of the image in horizontal bands at predetermined timed intervals. For example, when using a 512×480 image consisting of 64×60 blocks of 8×8 pixels, the first 10 rows of pixel blocks may be compressed and transmitted followed by the next 10 rows and so forth. However, during on-going system restart, the first 10 rows are from frame 1 and the second 10 rows are from frame 2. By restarting using predetermined portions of the displayed image, an entire new image is transmitted. For the above example 6 frames (1 second for this example) would have to be transmitted with the top band being the oldest video data (one second old) and the bottom band being the newest video data (⅙ of a second old). Upon completion of the restart, interframe processing using the Adaptive Threshold process explained above is resumed.

To efficiently implement the histogram and associated discrete distribution function in terms of memory required for histogram storage, the histogram memory may be made somewhat smaller than the largest possible size. For 8 bit pixel values, using every fourth pixel, a maximum DIFF(m, n) value is 4,096 for 8×8 pixel blocks ( 4×4×256, where 256 is the maximum difference between two 8 bit pixel values). It has been demonstrated in practice that 3,072 (3K) or less storage is required which effectively eliminates large variances. FIG. 3 illustrates this principle since there is one block of pixels in most bins past the x value of 1,440. Values of histogram bins being subtracted from the total number of p×p pixel blocks, 3,840 in the 64×60 block example, causes the number of blocks in the bins above 3,072 on the x-axis of FIG. 3 to be of no consequence. If there is no high motion in a given application, the truncation of histogram size is a sufficient solution. However, if high motion exists in an application, (such as sudden scene changes caused by a lens cap removal from a camera lens of video input 10 of FIG. 1) a full size histogram bin of 4,096 must be used or system overload may occur. Additionally, a predetermined bound or "upper limit" can be used to trap this condition to maintain use of a reduced size histogram buffer.

To inhibit transmissions of insignificant or undesirable video data, a hard limit can be imposed on Adaptive Threshold $TH_Y$ such that blocks below a certain level will not be transmitted. A hard limit is used to complement the Adaptive Threshold selected. The undesirable updating may be due to quantization errors in the video coder A/D conversion process. As the motion settles on video input 10 (the scene transitions from high to low motion) the Adaptive Threshold in FIG. 10 tends to become a smaller value. For example $TH_Y$ transitions from $TH_{Y1}$=560 to $TH_{Y2}$=300 in FIG. 10. The hard limit is illustrated at a threshold level of 400 in FIG. 12. Rather than compressing and transmitting pixel blocks with DIFF(m,n)>300 as determined by Adaptive Threshold $TH_{Y2}$ using FIG. 9, the blocks with a DIFF(m, n)>400 would be compressed and transmitted. The undesirable updating may manifest itself by the decoded image being updated during low motion scenes. A portion of the image may be updated and changed but the update may look no better than the previous image. The undesirable update may tend to move the image, thereby masking the effect annoying to the viewer. This problem may also be due to the intraframe compression process used.

The hard limit imposes a limit to the Adaptive Threshold to increase its usefulness in various situations. For fixed data rate channel 16 in FIG. 1, fill data would be sent (using channel 16) to fill the gap between 768 blocks required and 375 blocks to transmit in FIG. 12 using the hard limit to determine the number of blocks to transmit. When a variable data rate channel is used, fill data is not required. The lower numbers of transmitted blocks could be used for other data transmissions in channel 16 of FIG. 1 which could represent one half of a full-duplex packet switched, variable data rate channel such as a dial-up 56 kilobit per second pair as used for currently available teleconferencing equipment.

As an alternate embodiment to the hardware depicted in FIG. 1, the video coder 14 can be made more accurate in terms of the interframe compression process by including in current frame memory 29 of all previously transmitted blocks, an image which is reconstructed from the compressed video data. The earlier description detailed that current frame memory 29 contained video data which matched the video data which the decoder 18 has in frame memory 36. DSP 30 may be used to run the inverse compression process on the compressed video data block included in the update and store such results in current frame memory 29 via 31'. This storage of a reconstructed image in current frame memory 29 yield increased accuracy but consumes additional DSP 30 capabilities.

It is thought that the methods of the present invention and many of its attendant advantages will be understood from the foregoing description, and it will be apparent that various changes may be made in the form, construction and arrangement of the parts and the steps thereof without departing from the spirit and scope of the invention, or sacrificing all their material advantages, the forms described herein being merely preferred embodiments thereof.

I claim:

1. A method of performing data compression comprising the following steps:

calculating a measured difference between all positionally corresponding data blocks in a first data frame with those data blocks in a second data frame;

determining a discrete distribution function of the calculated data block differences;

determining an Adaptive Threshold for transmitting updated information based upon the calculated data block difference and data transmission rate;

compressing data blocks of a first and second data frame above the Adaptive Threshold;

creating a bit map for identifying updated and compressed data;

transmitting the updated data and the bit map; and receiving and decoding transmitted compressed data.

2. The method of claim 1 wherein the step of determining the discrete distribution function comprises calculation of a histogram of the calculated data block differences.

3. The method of claim 1 further comprising storing a reconstructed version of the transmitted compressed data in a memory device for comparision to a new frame data representation.

4. The method of claim 1 wherein the transmitted compressed data is processed in serial fashion.

5. The method of claim 1 further comprising inclusion of various limit values on the Adaptive Threshold to inhibit unwanted side effects or to conserve bandwidth.

6. The method of claim 1 further comprising storing original video image representing said transmitted compressed data in a memory device for reference with new frame data.

7. The method of claim 1 further comprising using an additional threshold value in calculating the measured difference between all positionally corresponding data blocks in the first and second data frame to minimize quantization effects.

8. The method of claim 7 wherein the additional threshold value is selected so as to approximate a mean square error calculation.

9. A method of performing data compression of data grouped in p×p blocks during system initialization comprising the following steps:

acquiring a data frame;

calculating a measured difference between all data blocks of the acquired data frame;

determining a discrete distribution function of the calculated block differences;

determining an Adaptive Threshold for transmitting updated information based upon the calculated difference and data transmission rate;

compressing the data blocks below the Adaptive Threshold;

creating a bit map for identifying updated and compressed data;

transmitting the updated data and the bit map;

storing position location of transmitted data blocks; and, repeating the above process until all data blocks have been transmitted at least once.

10. The method of claim 9 wherein the step of determining the discrete distribution function comprises calculation of a histogram of the calculated number of data block differences each subtracted from a total number of data blocks in a data frame.

11. The method of claim 9 wherein the data is video image data organized in a 512×480 array of 8×8 pixels.

12. The method of claim 9 wherein transmitted data is processed in serial fashion.

13. The method of claim 9 further comprising inclusion of a limit on the Adaptive Threshold to inhibit unwanted side effects or to conserve bandwidth.

14. The method of claim 9 further comprising storing transmitted compressed data in a memory device.

15. The method of claim 9 further comprising using an additional threshold value in calculating the measured difference to minimize quantization effects.

16. The method of claim 15 wherein the additional threshold value is selected so as to approximate a mean square error calculation.

* * * * *